Jan. 6, 1925. 1,522,378
J. E. McLEOD ET AL
ATTACHMENT FOR TRACTORS
Filed Dec. 18, 1923  2 Sheets-Sheet 2

Patented Jan. 6, 1925.

1,522,378

UNITED STATES PATENT OFFICE.

JOHN E. McLEOD AND JAMES D. CUMMINGS, OF WASHINGTON, KANSAS.

ATTACHMENT FOR TRACTORS.

Application filed December 18, 1923. Serial No. 681,434.

*To all whom it may concern:*

Be it known that we, JOHN E. MCLEOD and JAMES D. CUMMINGS, citizens of the United States, residing at Washington, in the county of Washington and State of Kansas, have invented certain new and useful Improvements in Attachments for Tractors, of which the following is a specification.

Our invention is an attachment for tractors by the use of which the surface of the ground may be easily brought into a level condition. The device is intended more particularly for filling ditches in which pipe lines have been laid but is capable of use as a grader and for other purposes. The invention is illustrated in the accompanying drawings and will be hereinafter fully set forth.

Figure 1:
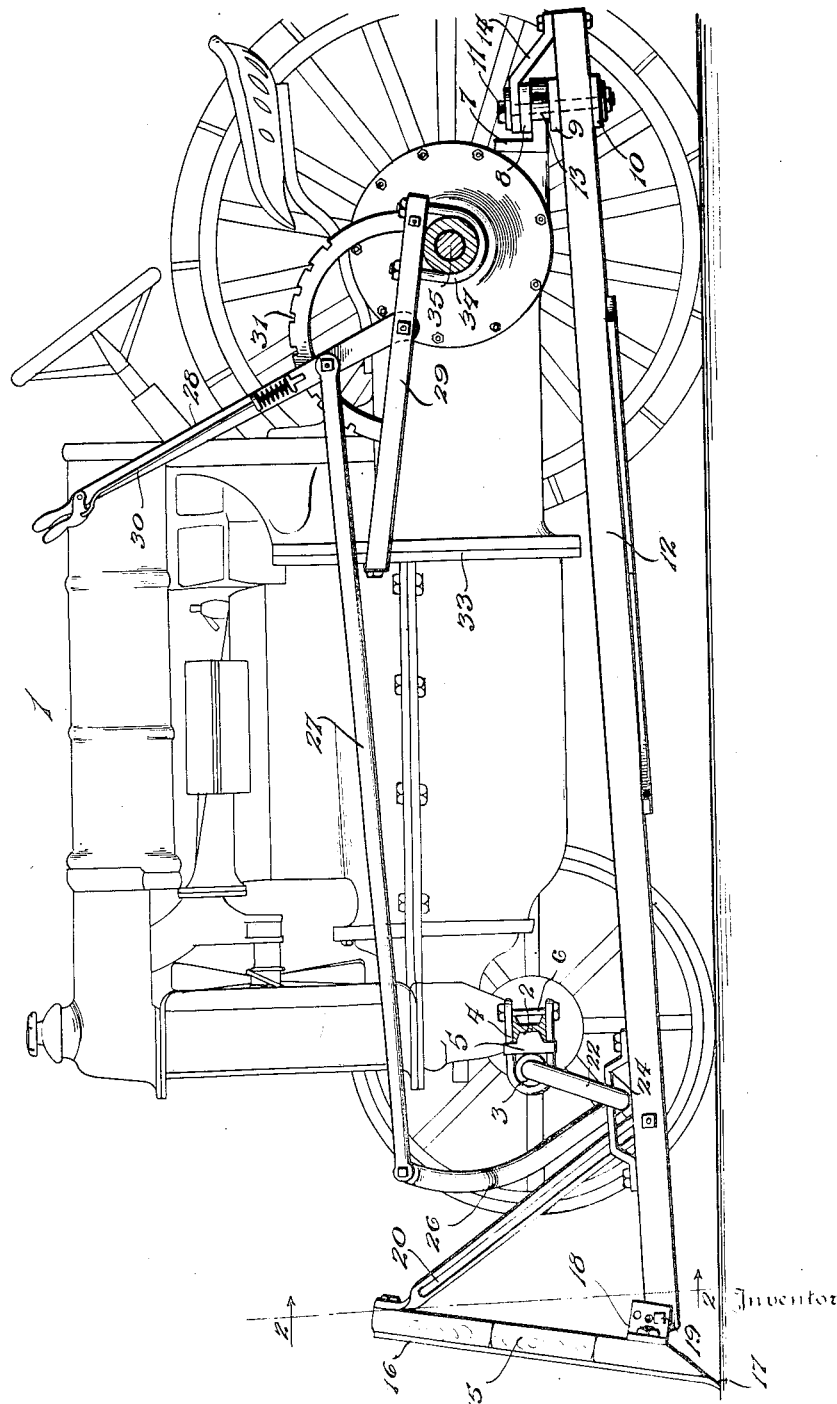
Figure 1 is a side elevation of a tractor having our attachment mounted thereon, the near wheels of the tractor being removed.
Figure 2:
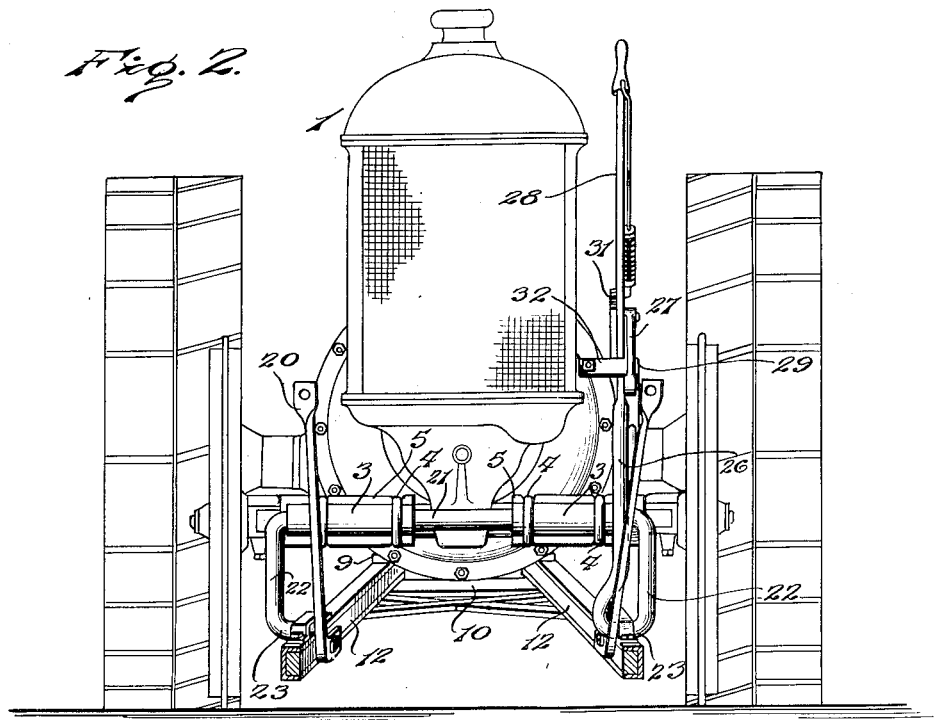
Fig. 2 is a view, partly in front elevation and partly in section, on the line 2—2 of Fig. 1.
Figure 3:
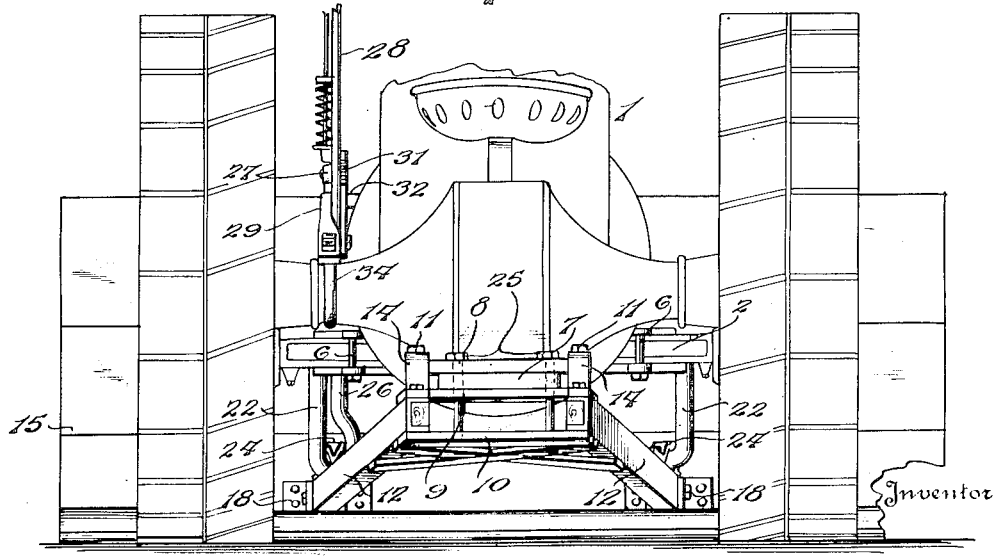
Fig. 3 is a rear elevation.

The tractor 1 may be of any well-known type and is illustrated in a more or less conventional manner. In carrying out our invention, we secure to the front axle 2 of the tractor a plurality of bearing sleeves 3 which are held to the axle by clip bolts 4 passed around the sleeves and the axle and through clip plates 5 which are disposed against the front side of the axle, locking bolts 6 being inserted through the rear ends of the clip bolts against the rear side of the axle to secure the parts in place, as shown in Fig. 1. We also attach to the usual drawbar 7 at the rear end of the tractor a draft device consisting of an upper clamp plate 8, an intermediate clamp plate 9 and a bottom clamp plate 10 which are disposed transversely and are preferably metal bars. In the normal arrangement of the parts, the upper and intermediate clamp plates 8 and 9 are disposed respectively over and under the drawbar 7, and bolts 11 are inserted through the ends of all the clamp plates and also through push bars 12 which are disposed between the ends of the intermediate and the bottom clamp plates and project slightly in rear of the same.

Spacing spools or sleeves 13 are disposed around the securing bolts 11 between the ends of the plates 8 and 9 so that these plates will be prevented from bending under the pressure applied thereto while at the same time they may be securely attached to the drawbar 7. Braces 14 are also provided extending from the rear ends of the push bars 12 to the upper ends of the bolts 11 and bear upon the upper side of the clamp plate 8, as shown. The push bars 12 extend forwardly below the tractor and under the front axle 2 in divergent relation and have their front ends connected with the scraper or leveling board 15. The leveling board or scraper may be constructed of stout planks reinforced by metal connecting straps 16 and a steel blade 17 secured along the lower edge of the board. On the rear side of the board near the lower edge thereof, we provide brackets 18 to which the front ends of the push bars 12 are attached, and these brackets are preferably provided with a plurality of openings through any one of which and the front ends of the push bars the fastening bolts 19 may be inserted so as to adjust the board to the work which it is to do. To secure the board in the relative angular position in which it has been set, braces 20 are provided, said braces having their upper ends secured to the rear side of the board adjacent the upper edge thereof and their lower ends secured to the push bars, as shown.

A rock shaft 21 is mounted in the bearing-sleeves 3, and this rock shaft is provided at its ends with cranks 22 which depend therefrom and have their lower ends turned inwardly, as shown at 23, to engage in loops 24 secured upon the upper sides of the push bars so that, if the shaft be rocked, the terminals of the cranks 22 will be swung upwardly or downwardly and by their engagement with the loops 24 will effect a raising or lowering of the front ends of the push bars and of the scraper or lifting board. It is to be noted that, while the clamp plates 8, 9 and 10 are to be so engaged with the drawbar 7 as to firmly support the rear ends of the push bars and prevent them being forced off the drawbar under the strain to which they are subjected at work, the said plates should have a slight rocking movement upon the drawbar so as to accommodate the vertical adjustment of the front ends of the push bars. To aid in preventing release of the clamp plates from the drawbar, a bolt 25 may be inserted centrally through the upper clamp plate 8 into the drawbar, the opening through the plate 8 being of such diameter that the relative rocking movement will be permitted. The terminal of one crank 22, preferably that crank at the left side of the machine, is merged into an upwardly projecting crank or rocking arm 26 which extends upwardly in divergent relation to the adjacent crank 22 and has its upper end pivoted to the front end of a pitman or connecting rod 27. The rear end of said connecting rod 27 is pivoted to a hand lever 28 which is fulcrumed upon a bracket 29 at the rear of the tractor and is equipped with the usual latch 30 co-operating with a holding segment 31 arranged concentric with the fulcrum of the lever in the usual manner. The bracket 29 consists of a metal bar or strap having its front end bent inwardly, as shown at 32, to be bolted to the flange 33 of the transmission case of the tractor, and provided at its rear end with a clip bolt 34 passing below the rear axle 35 of the tractor and secured in the rear end of the bracket, as shown clearly in Fig. 1, whereby the bracket will be supported upon the rear axle or the rear axle housing.

Ordinarily, the rear ends of the push bars are supported upon the drawbar 7 of the tractor in the position illustrated in the drawings and the propelling force is applied through the push bars to the leveling board adjacent the lower edge of the same. It is generally desirable to have the push bars disposed as low as possible in order to avoid digging of the scraper blade into the ground, but it may sometimes be advantageous, as when working in loose sandy soil, to set the push bars somewhat higher and in such event the plates 9 and 10 are disposed respectively over and under the drawbar 7, the plate 8 then being an idle plate above the drawbar. By securing the front ends of the push bars to the brackets 18 in the manner shown and described, the scraper or leveling board may have a limited pivotal adjustment so that the angle at which it may work may be varied and, by properly setting the hand lever 28, the scraper may be set to work at any desired depth or may be set clear of the ground so that the machine may be stored or may be carried from one scene of operation to another working point.

Our attachment is exceedingly simple in the construction and arrangement of its parts and may be readily applied to a tractor without necessitating any substantial change in the construction of the latter or any rearrangement of its parts. When the use of the attachment is no longer desired, it may be easily removed so that the tractor is available for other purposes.

Having thus described the invention, we claim:

1. An attachment for tractors comprising a pair of push bars to be disposed below the tractor, a scraper carried by the front ends of the push bars, means to be mounted on the tractor for supporting the front ends of the push bars and adjusting the same vertically, clamp plates secured to the push bars near the rear ends thereof, and means for mounting said clamp plates upon the drawbar of the tractor.

2. An attachment for tractors comprising a pair of push bars to be disposed below the tractor, a scraper carried by the front ends of the push bars, means to be mounted upon the tractor for supporting the front ends of the push bars, clamp plates secured to the push bars near the rear ends thereof, a clamp plate disposed above and in spaced relation to the first-mentioned clamp plates and adapted to extend across the drawbar of the tractor, and braces extending between the ends of the last-mentioned clamp plate and the rear ends of the push bars.

3. An attachment for tractors comprising a pair of push bars to be disposed below the tractor, means for connecting the rear ends of the push bars with the drawbar of the tractor, bearing sleeves secured to the front axle of the tractor, a rock shaft journaled in said sleeves and provided at its ends with cranks having movable connection with the push bars, means to be mounted upon the tractor for rocking the said shaft whereby to effect vertical adjustment of the front ends of the push bars, and a scraper carried by the front ends of the push bars.

4. An attachment for tractors comprising a pair of push bars to be disposed below the tractor, means for connecting the rear ends of the push bars with the drawbar of the tractor, a rock shaft to be mounted upon the front axle of the tractor, elongated loops on the push bars near the front ends thereof, cranks at the ends of said rock shaft having their terminals engaged in said loops, means to be mounted upon the tractor for rocking the shaft, and a scraper carried by the front ends of the push bars.

5. An attachment for tractors comprising a pair of push bars to be disposed below the tractor, means for connecting the rear ends of the push bars with the drawbar of the tractor, a rock shaft mounted upon the front axle of the tractor and provided at its ends with cranks engaged with the push bars, a rocking arm extending upwardly from one of said cranks, a lever mounted upon the tractor at the rear end thereof, a pitman connecting the lever with the said rocking arm, and a scraper carried by the front ends of the push bars.

6. An attachment for tractors comprising a pair of push bars to be disposed below the tractor, means for connecting the rear ends of the push bars with the drawbar of the tractor, a scraper carried by the front ends of the push bars, a rock shaft mounted upon the front axle of the tractor, cranks at the ends of the rock shaft engaged with the push bars, a bracket secured at its front end to the transmission casing of the tractor and resting at its rear end upon the rear axle casing, a clip retaining the rear end of said bracket upon the axle casing, a hand lever mounted upon said bracket, and connections between said lever and the rock shaft.

In testimony whereof we affix our signatures.

JOHN E. McLEOD. [L. S.]
JAMES D. CUMMINGS. [L. S.]